United States Patent [19]

Laune

[11] 4,072,318
[45] Feb. 7, 1978

[54] BABY CARRIAGE

[75] Inventor: Pierre Laune, Attiches, France

[73] Assignee: Eurolando, Attiches, France

[21] Appl. No.: 731,375

[22] Filed: Oct. 12, 1976

[30] Foreign Application Priority Data

Oct. 9, 1975 France .................................. 75 30904

[51] Int. Cl.² .............................................. B62B 7/08
[52] U.S. Cl. ...................... 280/42; 280/650; 297/328
[58] Field of Search ................... 280/31, 47.18, 47.38, 280/47.39, 47.4, 47.41, 42, 650; 297/328, 377, 255, 256, 441

[56] References Cited

U.S. PATENT DOCUMENTS

| 2,305,249 | 12/1942 | Frost | 297/441 |
| 2,738,001 | 3/1956 | Drabert | 297/328 |
| 3,550,998 | 12/1970 | Boudreau | 280/31 |
| 3,967,833 | 7/1976 | Fleischer | 280/47.38 |

Primary Examiner—Robert R. Song
Attorney, Agent, or Firm—George H. Mitchell, Jr.

[57] ABSTRACT

A carriage for carrying a baby or child is disclosed wherein a wheeled chassis has attached to it a body for carrying the child, the body being adjustable to facilitate various sizes of children. The body is adjustably attached to the chassis to readily move from a sitting to a horizontal position. The body also adjusts so as to accept a mattress for an infant and to form a seat for an older child.

6 Claims, 11 Drawing Figures

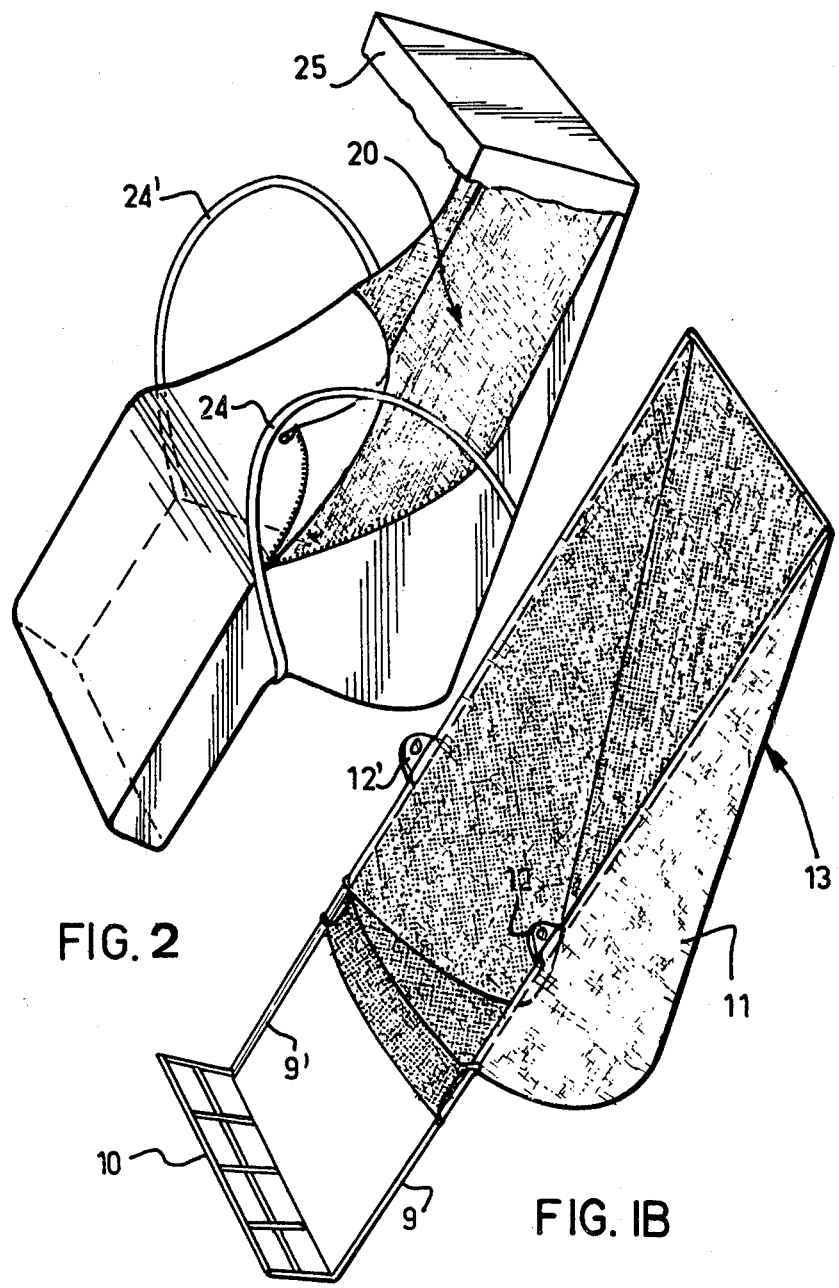

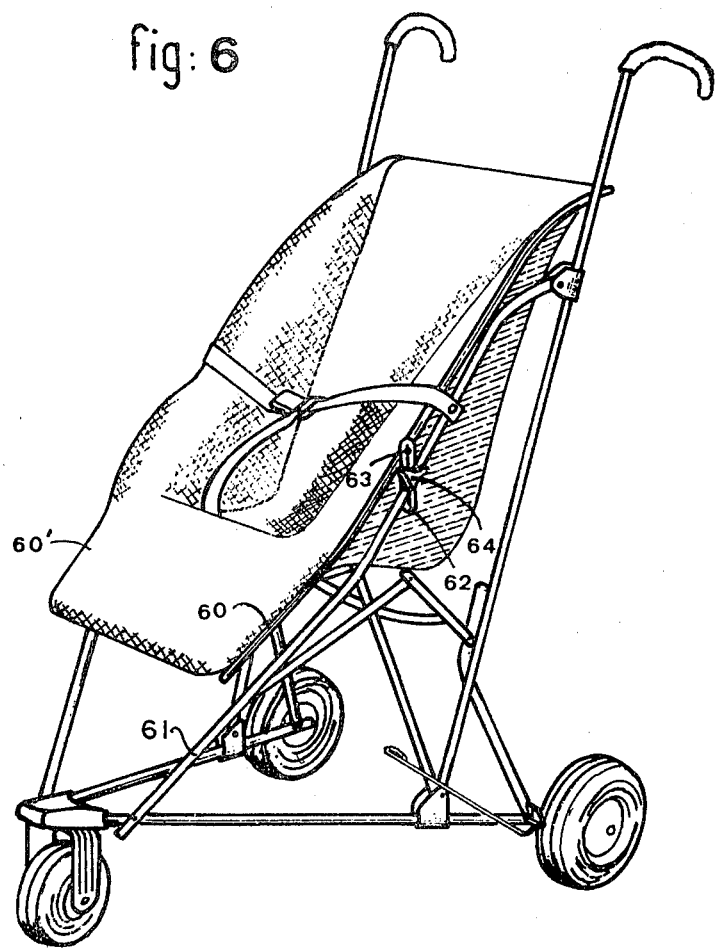
fig: 6

BABY CARRIAGE

The present invention relates to a carriage for carrying a baby or child and constituting a baby-carriage or stroller.

As the baby grows, the carriages used by the parents to carry it become progressively unsuitable and must be replaced; the baby carriage in which the baby is lying down is succeeded by the stroller in which the child is in sitting position; a light, collapsible stroller is also used which can be carried easily and stored away more simply in small apartments.

It is an object of the present invention to provide a versatile baby/child carriage which may be used both as carriage for the baby lying down and as stroller for the child sitting up.

The invention relates to a baby/child carriage of the type comprising a chassis and a body mounted thereon, said body being constituted by two lateral members mounted on the chassis via two pivot pins, the two lateral members being disposed parallel to each other and being capable of angular displacements, the baby/child carriage further comprising means for locking each of the lateral members in a determined angular position, said lateral members comprising flexible structure forming a seat connected thereto and adapted to accommodate the baby or child.

With this essential feature of the invention in mind, it is readily appreciated that, due to the pivoting of the body, said latter may occupy positions varying from a substantially horizontal position or one slightly inclined with respect to the horizontal, (corresponding to a baby lying down) to an inclined position corresponding to a child sitting up.

The invention will be more readily understood on reading the following description with reference to the accompanying drawings, in which:

FIG. 1b is a perspective view of the baby supporting structure of FIG. 1a.

FIG. 2 shows a variant embodiment in which the body is associated with a carry cot arrangement.

FIG. 6 shows a variant embodiment wherein the lateral members are in substantially horizontal position.

Figure 1A:
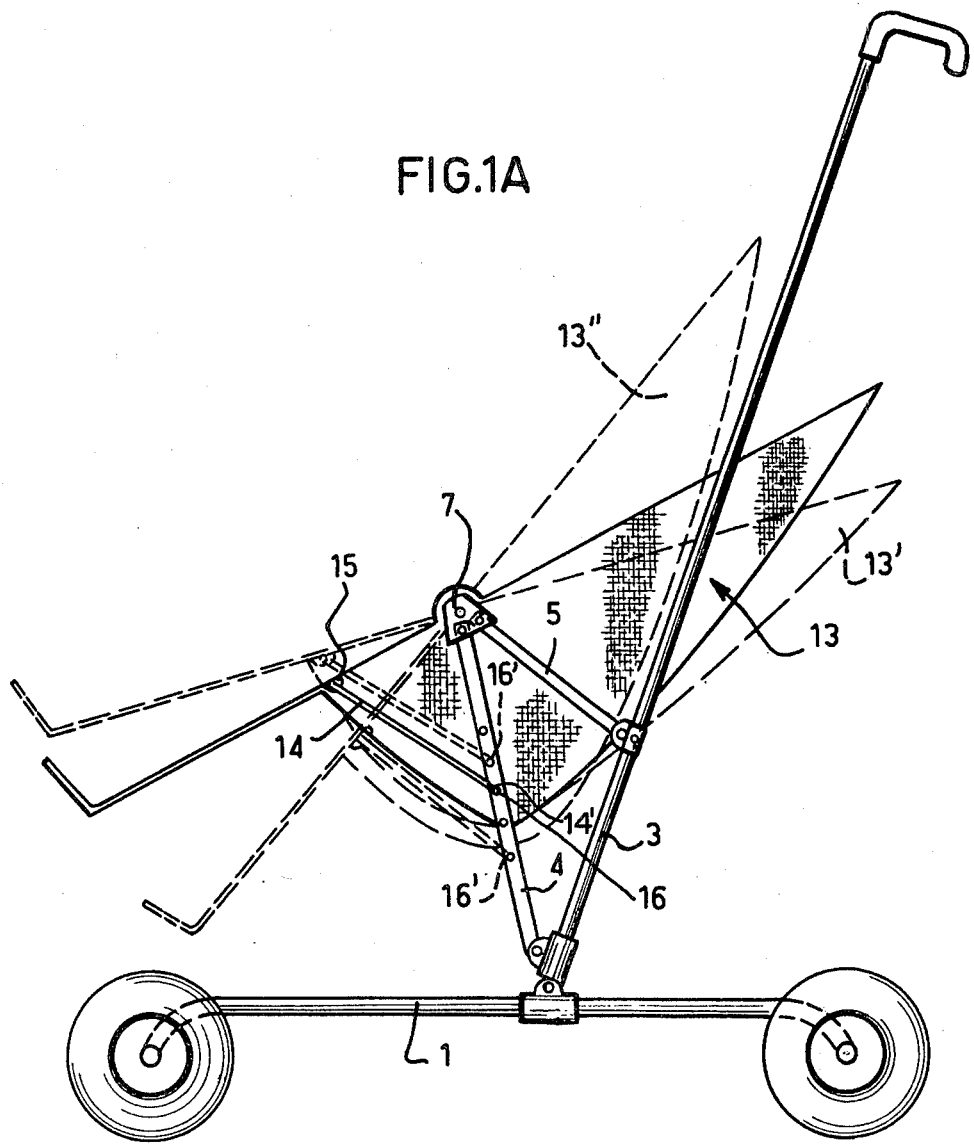
FIG. 1a is a view in side elevation of a baby/child carriage provided with the body according to the invention.

Referring now to the drawings, FIGS. 1a and 1b show the chassis of a baby/child carriage constituted, in manner known per se, by a lower lateral member 1 on which the upright handle 3 is disposed. A mobile support device is connected to the handle 3, constituted by frame rods 4 and 5 forming a support bracket.

The invention is directed essentially to the assembly supporting the baby or child which is constituted by two lateral members 9 and 9' and a flexible structure 11, of type known per se; the bottom of the lateral members may support a transverse foot rest 10 made of rigid or preferably flexible material, thus enabling the two lateral members 9 and 9' to be brought together when the assembly is mounted on a collapsible chassis.

Each lateral member has a pivot pin bracket 12 located substantially at its centre so as to balance the weights supported by the two halves of the said members, this bracket having a pivot pin, mounted on the plate 7 passing therethrough; this pin is associated with devices for tightening by means of knurled screws; in this way, the support assembly 13 can be tipped or pivoted angularly with respect to the axes 12, 12'.

FIG. 1a shows that this seat can occupy the intermediate position shown in solid lines or a position closer to the horizontal, shown in broken lines at 13' or further a position closer to the vertical, shown in broken lines at 13".

A stay rod 14, pivoted at 15 to the lateral member ensures that the support is immobilised in the chosen position; to this end, the base 14' of said rod may be engaged in a notch 16,16',16" made in frame rod 4.

As shown in FIG. 2, the assembly may be associated with a carry cot arrangement 20 provided with two handles 24,24' for carrying it.

An optional canopy 25 may advantageously complete the carry cot for protection against the sun or rain.

Figure 4:
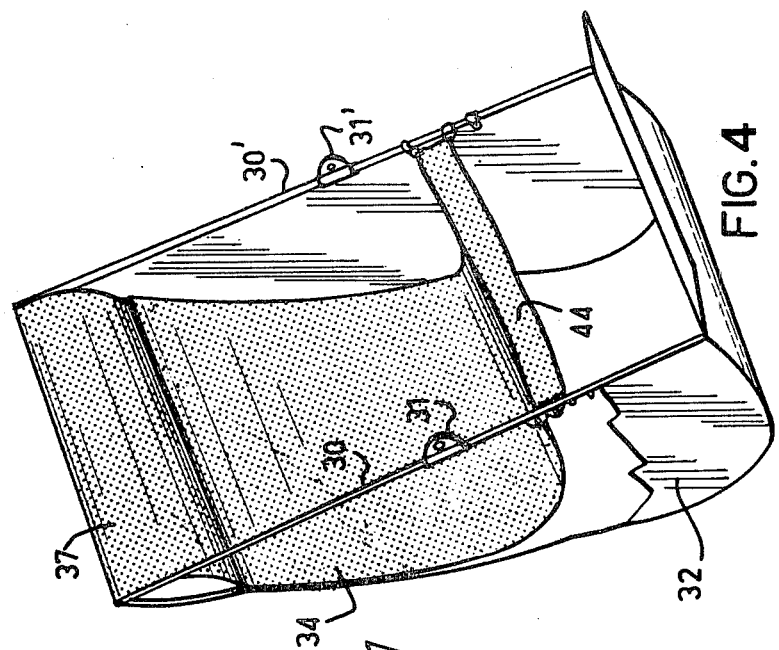
FIG. 4 shows the support of FIG. 3 in perspective and in an inclined position, the flexible structure being in a position forming seat.
Figure 3:
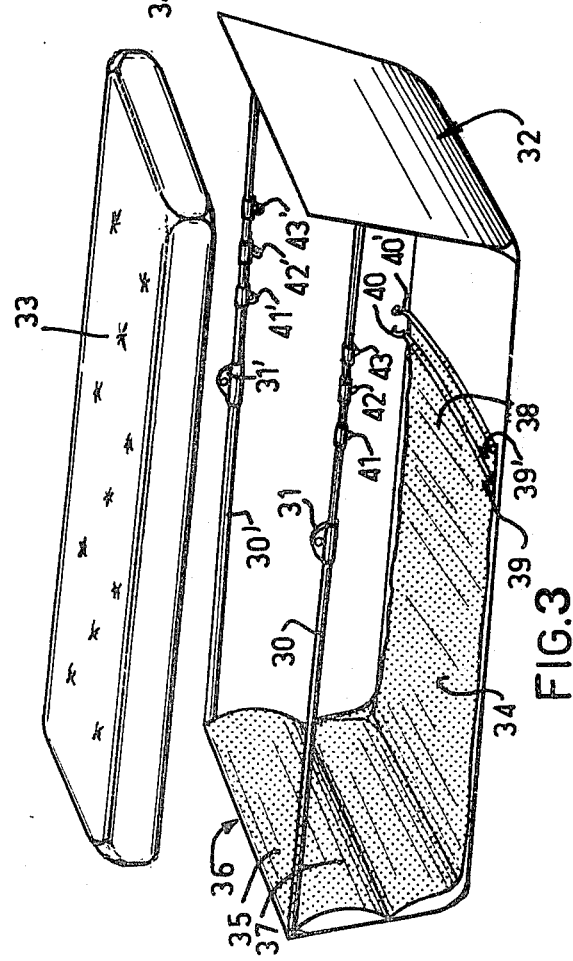
FIG. 3 is a variant embodiment of the invention in perspective.

FIGS. 3 and 4 show a variant embodiment in which the two lateral members 30 and 30' are also provided with a pivot pin bracket 31,31' for pivotally joining the lateral members to the chassis of the baby/child carriage.

Figure 5A:
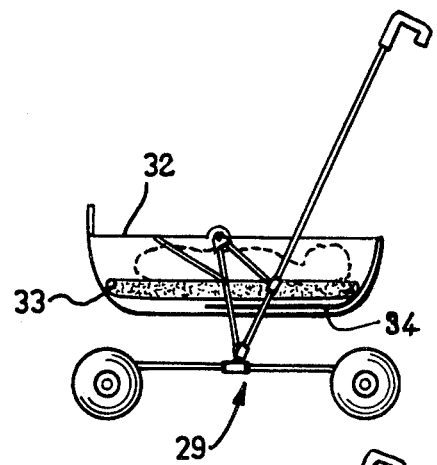
FIGS. 5a, 5b and 5c show the device of FIGS. 3 and 4 in three positions corresponding to three stages of development of the baby and child
Figure 5B:
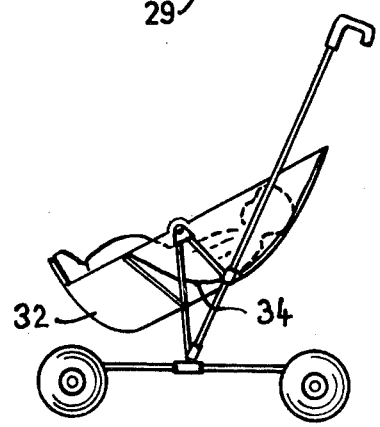

From the lateral members 30,30' is suspended the supple structure 32 forming the four side walls and the bottom of a cradle adapted to receive the mattress 33 constituting the baby's bedding (in the position shown in FIG. 5a).

Inside the structure 32 is an internal structure 34 made of flexible material, for example fabric or synthetic material, said structure being joined by its end 35 to the structure 32 along its upper transverse edge 36.

To bring the cradle 32 into seat position, the lateral members 30 are so pivoted as to come into an inclined position as shown in FIG. 5a; in addition, the bottom end 38 of the structure 34 is joined to the lateral members to form the seat adapted to receive the child in sitting position; to this end; the end 38 comprises suitably spaced hooks 39,39' and 40,40' adapted to cooperate with eyes 41,42,43 and 41',42', 43' arranged on the lateral members 30 and 30', 43'

The use of two adjacent hooks will enable a fold 44 to be made, forming the bottom edge of the seat, this fold being more comfortable than the edge which would be constituted by the bottom edge of the sheet of textile material. The fact that there are three eyes for two hooks therefore offers a choice between two positions of the hooks, this therefore making it possible to locate the edge of the seat 44 at a suitable spot depending on the size and degree of development of the child.

Figure 5C:
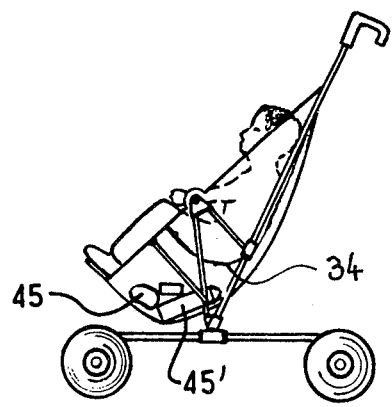

FIG. 5c shows that the inclination of the lateral members may also be accentuated so as to obtain a seat in which the child will be nearer the vertical when he has grown and able to sit up; the angular position of the lateral members may be modified very quickly; for example, the lateral members may be brought into a position closer to the horizontal if the child wishes to sleep.

As may be seen in FIG. 5c, the bottom of the seat constituted by the wall 32 of the cradle located near the feet may advantageously be used to carry packets or purchases 45,45' and the bottom of the cradle will thus constitute a shopping bag.

Figure 7:
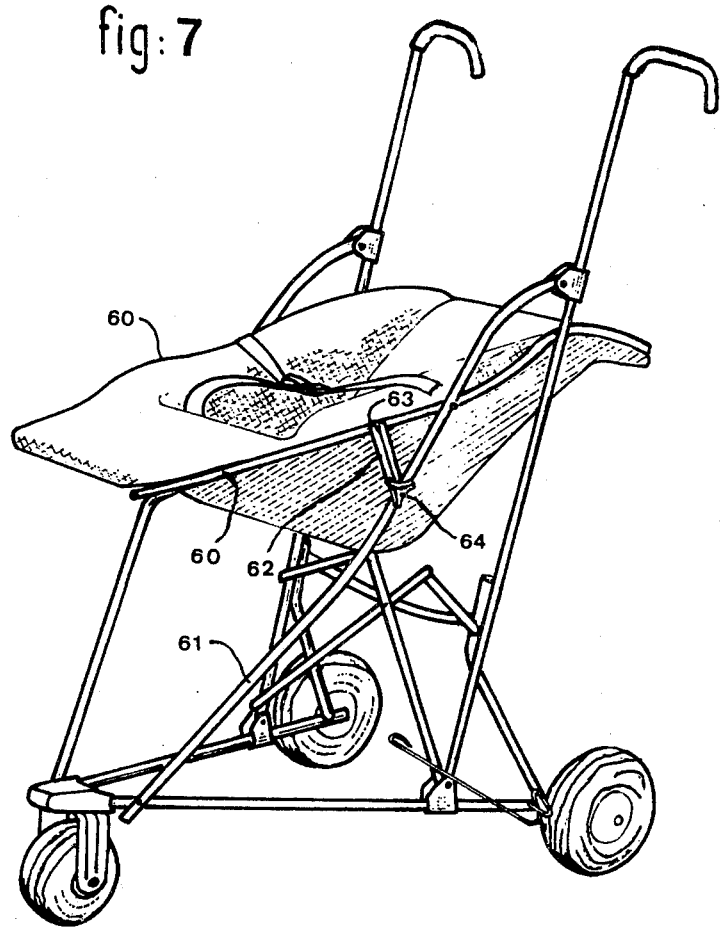
FIG. 7 shows the variant embodiment of FIg. 6, the lateral members being inclined.

FIGS. 6 and 7 show a variant embodiment in which the lateral members 60 and 60' are pivoted about the chassis 61; each lateral member has a bracket 62, itself pivoted about the lateral member at 63; the bracket has a longitudinal slot through which passes a locking screw manoeuvred by screw 64, and mounted on the chassis 61.

Figure 8:
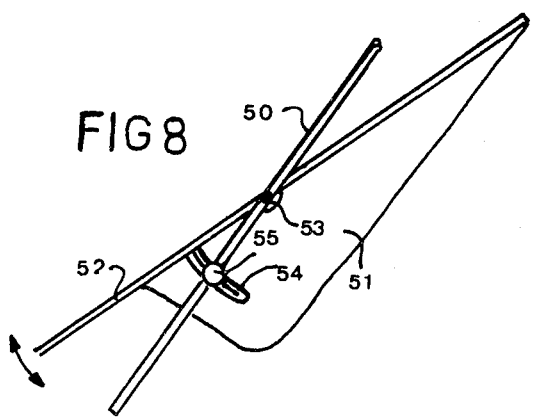
FIG. 8 shows a detail of the device for locking the lateral members in the desired position.

According to a variant of the locking device as shown in FIG. 8, the bracket is constituted by an arcuate adjustment bracket 54 fast with the lateral member 52 pivoting with respect to the chassis 50 about pivot 53; the adjustment bracket is locked against the chassis 50 via the adjustment tightening screw assembly 55.

What we claim is:

1. A baby/child carriage of the type having a transversely collapsible chassis and a body mounted thereon to support the baby or child either in a prone or in a sitting position; said body comprising:
   (a) two lateral members independent of and parallel to each other and pivotally mounted on the chassis by two pivot pins forming articulations for said lateral members on the chassis, thus permitting each of the lateral members to pivot in a vertical plane;
   (b) manually operable means for locking each of the lateral members in a plurality of determined angular positions with respect to the chassis, and;
   (c) a flexible support forming structure connected to the lateral members and adapted to accommodate the baby or child; thus enabling the two lateral members to be brought together to form a collapsed bundle when the chassis is put in collapsed position.

2. A baby/child carriage according to claim 1, wherein each lateral member includes a bracket member for locking said lateral member in said determined angular positions with respect to the chassis.

3. A baby/child carriage according to claim 2, wherein said bracket member comprises a metal bar pivotally mounted on the lateral member and is provided with a central slot, the chassis being provided with locking means comprising a tightening screw arrangement mounted on the chassis to pass through said slot so as to allow said metal bar to be immobilized with respect to the chassis.

4. A baby/child carriage according to claim 1, wherein the flexible structure comprises a first flexible structure constituting, in manner known per se, the walls and the bottom of a cradle, this structure being adapted to receive a mattress for the baby to lie on, and a second flexible structure joined at one end to an upper transverse edge of the first structure, the second structure being of supple material and lying freely in the bottom of the first structure when said latter is used as cradle, the free end of said second structure being provided with hooking means for joining its corners to complementary hook members suitably disposed on each of the lateral members, which, after the lateral members have been suitably inclined, enables the second structure to be used as a seat.

5. A baby/child carriage according to claim 4, wherein the free end of said second flexible structure and the lateral members each have a plurality of complementary hook members thereon for connecting each of the free corners of the second structure to at least two adjacent points of support on the lateral members thus forming a fold in said sheet and constituting a support for the inside of the child's knees.

6. A baby/child carriage according to claim 4, wherein the second structure comprises a flexible sheet, the free edges of said sheet having a plurality of hook means thereon for removing joining the edges of said sheet to each lateral member at several points, thus varying the position of the terminal edge of said structure constituting the end of the seat, along said lateral members, depending on the child's size.

* * * * *